United States Patent [19]

Asai et al.

[11] Patent Number: 4,460,330
[45] Date of Patent: Jul. 17, 1984

[54] FLUIDIZED-BED COMBUSTION SYSTEM

[75] Inventors: Minoru Asai, Kamagaya; Kiyoshi Aoki, Chiba; Osamu Takeuchi, Mitaka, all of Japan

[73] Assignee: Ishikawajima-Harima Jukogyo Kabushiki Kaisha, Tokyo, Japan

[21] Appl. No.: 483,109

[22] Filed: Apr. 8, 1983

[30] Foreign Application Priority Data

Apr. 20, 1982 [JP] Japan .................................. 57-65707

[51] Int. Cl.$^3$ ............................................ F23D 19/00
[52] U.S. Cl. ...................................... 431/170; 431/7; 431/328; 34/57 B; 110/263
[58] Field of Search .......................... 431/7, 170, 328; 165/104.16; 432/14, 58; 122/4 D; 422/139; 34/57 B, 57 A; 110/263

[56] References Cited

U.S. PATENT DOCUMENTS

| | | | |
|---|---|---|---|
| 2,835,483 | 5/1958 | Lindsay | 122/4 D |
| 3,633,887 | 1/1972 | Bechtold et al. | 431/170 X |
| 4,148,437 | 4/1979 | Barker et al. | 431/170 X |
| 4,259,088 | 3/1981 | Moss | 431/7 X |
| 4,311,278 | 1/1982 | Sutton | 431/170 X |

Primary Examiner—Samuel Scott
Assistant Examiner—Randall L. Green
Attorney, Agent, or Firm—Alfred E. Miller

[57] ABSTRACT

A fluidized-bed combustion system for a boiler, a heating furnace for heating steels or the like, in which a plurality of gas distribution pipes are disposed at the bottom of the combustion chamber. The lower end of each gas distribution pipe is communicated with an air supply line with an air flow rate control valve and a fuel supply line with a fuel flow rate control valve and the air and fuel admitted into the gas distribution pipe are mixed within the same and the air and fuel mixture is injected or sprayed into the fluidized bed through injection ports of the gas distribution pipe which are positioned adjacent to the bottom of the fluidized bed, whereby the complete combustion within the fluidized bed can be ensured and the combustion can be controlled over a wide range and optimized depending upon a load.

8 Claims, 4 Drawing Figures

FLUIDIZED-BED COMBUSTION SYSTEM

BACKGROUND OF THE INVENTION

The present invention relates to a fluidized-bed combustion system for use with a heating furnace, a boiler or the like.

In FIG. 1 is schematically shown a prior art fluidized-bed combustion system in which a fluidized bed c of solid particles is produced and maintained by the air introduced into the vessel through an air supply line a and distributed through a gas distributor b in the form of a perforated plate or an assembly of gas distribution pipes. Fuel supplied through fuel lines d is distributed through the gas distributor b into the fluidized bed c and burned.

The prior art fluidized-bed combustion system of the type described however has the defect that it takes a relatively long period of time for making the combustion mixture of air and fuel so that it becomes difficult to attain the full or 100% combustion of fuel in the fluidized bed c. As a result, the combustion zone expands beyond the fluidized bed c into the freeboard e and therefore sufficient transmission of heat produced by the combustion to the solid particles in the fluidized bed c cannot be attained. As a consequence, the fluidized bed c cannot reach a sufficiently high temperature so that the heat of radiation emitted from the solid particles in the fluidized bed c and the contact or direct heat transmission capability are inevitably decreased and subsequently the solid particles in the fluidized bed c cannot be heated satisfactorily and the complete combustion of fuel cannot be attained. In addition, if the flow rate of fuel is reduced while the flow rate of air is maintained unchanged so as to vary the load, the mixing between air and fuel is degraded so that it becomes difficult to burn the fuel within the fliudized bed c of a predetermined height. Consequently it becomes difficult to vary the load over a wide range.

The present invention was therefore made to overcome the above and other problems encountered in the prior art fluidized-bed combustion system and has for its object to provide a novel fluidized-bed combustion system in which a plurality of gas distribution pipes are disposed at the bottom of a furnace shell or combustion chamber, each gas distribution pipe being communicated with an air supply line with an air flow rate control valve and a fuel supply line with a fuel flow rate control valve so that the air and the fuel admitted into the gas distribution pipe are mixed therein and the resulting combustion mixture is injected or sprayed into the fluidized bed through injection ports of the gas distribution pipe adjacent to the bottom of the fluidized bed, whereby the combustion efficiency can be much increased and the combustion can be controlled over a wide range and consequently optimized depending upon a load.

The present invention will become more apparent from the following description of the preferred embodiments thereof taken in conjunction with the accompanying drawings.

DESCRIPTION OF THE PREFERRED EMBODIMENT

Figure 1:
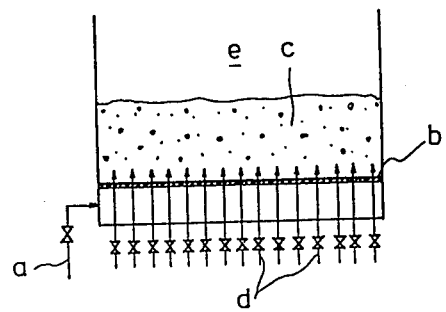
FIG. 1 is a schematic view of a prior art fluidized-bed combustion system.
Figure 2:
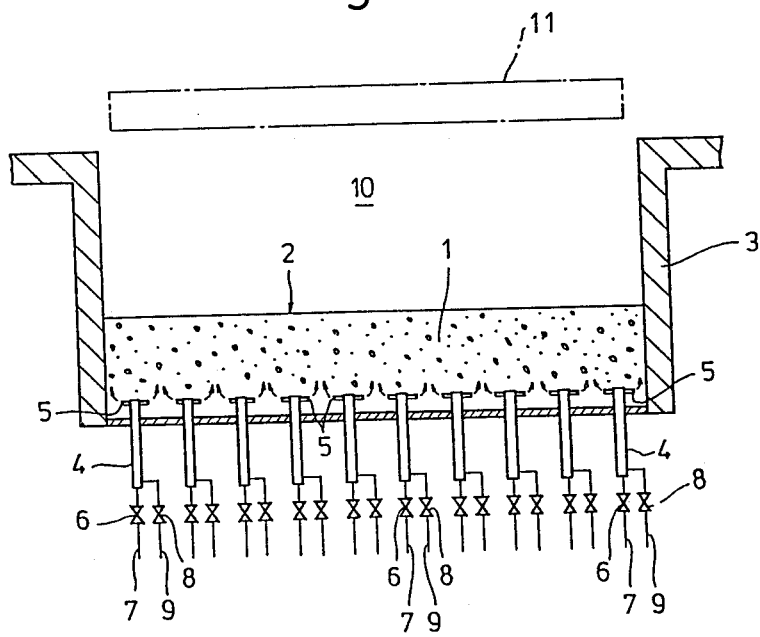
FIG. 2 is a longitudinal or vertical sectional view of a preferred embodiment of a fluidized-bed combustion system in accordance with the present invention.

Referring first to FIG. 2, a mass of solid particles 1 which form a fluidized bed 2 are charged at the bottom of a reaction or combustion vessel 2. A plurality of gas distribution pipes 4 extend into the fluidized bed 2 through the bottom of the reaction vessel and are spaced apart from each other by a predetermined distance. Each gas distribution pipe 4 is provided at the upper end thereof with a plurality of equiangularly spaced gas injection ports 5 which are radially outwardly and horizontally directed and are located closer to the bottom of the fluidized bed 2 than to the top thereof. The lower end of the gas distribution pipe 4 is connected to a fuel supply line 7 with a fuel flow rate control valve 6 and to an air supply line 9 with an air flow rate control valve 8 so that the fuel and the air are introduced and mixed with each other in the gas distribution pipe 4. The combustion mixture of air and fuel is injected into the fluidized bed 2 through the injection ports 5. A workpiece such as a steel 11 to be heated is disposed at the top portion of a freeboard 10 of the furnace vessel 3.

Figure 3:
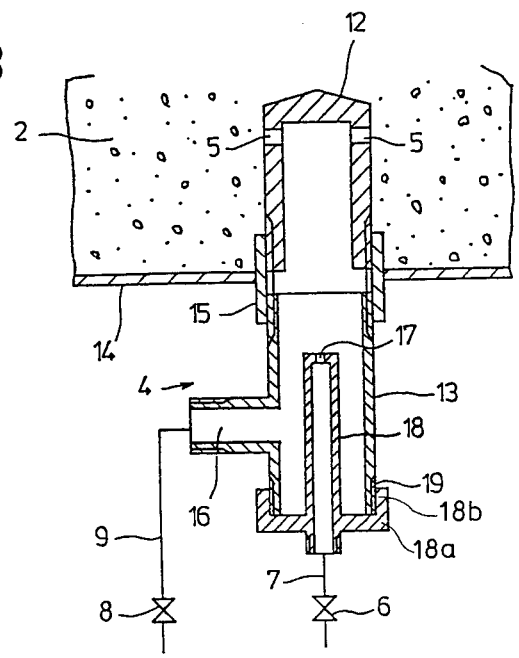
FIG. 3 is an axial sectional view of a gas distribution pipe used in the present invention.

Referring next to FIG. 3, the construction of the gas distribution pipe 4 will be described in more detail. The gas distribution pipe 4 comprises in general an inner injection pipe section 12 which is disposed within the fluidized bed 2 in the furnace shell and an outer mixing pipe section 13 which is disposed exterior of the furnace shell and is connected to the inner injection pipe section 12 through a connecting socket or unit 15 which extends gas-tightly through the bottom 14 of the furnace shell. Both the inner and outer mixing pipe sections 12 and 13 may be threaded into the socket or unit 15. The inner pipe section 12 has its top closed and is formed with a plurality of equiangularly spaced and radially outwardly and horizontally directed combustion-mixture injection ports 5 adjacent its top.

The outer mixing pipe section 13 is formed adjacent to its lower end with an air inlet port 16 which extends radially outwardly and is connected to the air supply line 9 so that the combustion air can be introduced into the outer mixing pipe section 13 in the radial direction. A fuel injection pipe 18 with a flange 18a is detachably attached to the lower end of the outer mixing pipe 13 and is communicated with the fuel supply line 7. More particularly, an internal thread 18b of the flange 18a of the fuel injection pipe 18 is engaged with an external thread 19 at the lower end portion of the outer mixing pipe section 13 and the fuel injection pipe 18 extends into the outer mixing pipe section 13 substantially coaxially thereof and beyond the opening of the air inlet port 16 by a predetermined length or height. A fuel injection port 17 is opened at the top of the fuel inlet pipe 18. Thus the fuel flows through the fuel supply line 7 and the fuel injection pipe 18 and is sprayed through the fuel injection port 17 and mixed with the combustion air introduced through the air supply line 9 and the air inlet port 16. The combustion mixture thus prepared flows upward into the inner injection pipe section 12 and is sprayed through the injection ports 5 into the fluidized bed 2.

Figure 4:
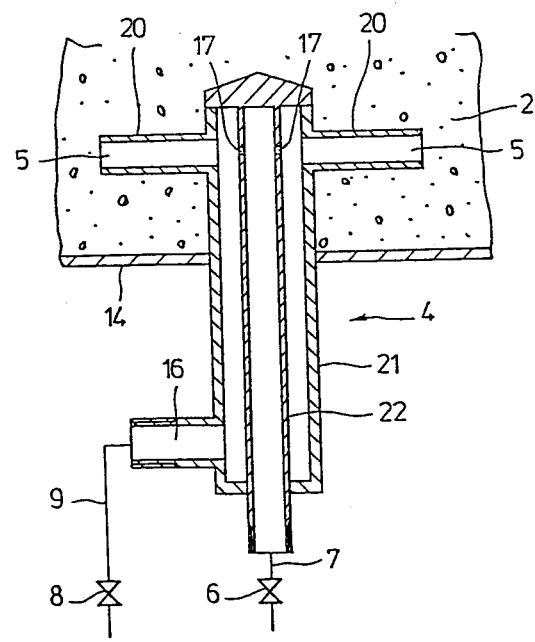
FIG. 4 is an axial sectional view of a variation of the gas distribution pipe used in the present invention.

Referring next to FIG. 4, a variation of the gas distribution pipe used in the present invention will be described in detail below. The gas distribution pipe 4 comprises in general an outer pipe section 21 and an inner or fuel inlet pipe section 22. The air inlet port 16 extends radially outwardly of the outer pipe section 21 and is communicated with the air supply line 9 and a plurality of equiangularly spaced combustion-mixture injection nozzles 20 each for providing the injection port 5 are extended radially outwardly from the outer pipe section 21 adjacent the top end thereof. The inner or fuel inlet pipe section 22 extends through the bottom of the outer pipe section 21 into the same coaxially thereof and has its upper end connected to the closed top end of the outer pipe section 21. The lower end of the inner or fuel inlet pipe section 22 is communicated with the fuel supply line 7 and a plurality of fuel injection ports 17 are formed through the wall of the inner or fuel inlet pipe section 22 adjacent to the top end thereof and in opposed relationship with the nozzles 20 of the outer pipe section 21. Thus the fuel sprayed through the fuel injection ports 17 is mixed with the combustion air supplied through the air inlet port 16 into the outer pipe section 21 and the thus prepared admixture of air and fuel is sprayed through the nozzle ports 5 into the fluidized bed 2.

As described above, according to the present invention, the air supplied through the air supply line 9 and the fuel supplied through the fuel feed line 7 are mixed well in the gas distribution pipe 4 and then sprayed through the nozzle ports 5 into the fluidized bed 2 so that the solid particles in the fluidized bed 2 are sufficiently fluidized and the combustion mixture is burned by the heat from the solid particles which are heated at high temperatures. The solid particles in the fluidized bed 2 are in turn heated by the products of combustion while the latter rise through the bed 2. Since the air and the fuel have been premixted, the smooth and efficient combustion of fuel is ensured so that no combustion takes place in the freeboard 10 and consequently the heat liberated by the combustion of fuel can be efficiently transferred to the solid particles in the fluidized bed 2. Thus radiation of heat can be much enhanced. In addition, the height of the fluidized bed 2 can be reduced. Furthermore since the combustion is efficiently carried out within the fluidized bed 2, partial or local combustion can be well controlled by controlling the ratio of the air and the fuel in the gas distribution pipe 4 so that the load can be varied over a wide range.

It is to be understood that the present invention is not limited to the embodiment described above and that various modifications can be effected without departing the true spirit of the present invention. For instance, the design, construction and location of the gas distribution pipes can be varied within the scope of the present invention. So far the present invention has been described in conjunction with the heating of steel products 11 (See FIG. 2), but the fluidized-bed combustion system of the present invention may equally be applied to an incinerator for burning refuse, a boiler or the like.

The novel effects and advantages of the present invention may be summarized as follows:

(i) The combustion air and the fuel are mixed within the gas distribution pipes and then injected into the fluidized bed so that the fluidized bed may be maintained and the combustion mixture may be burned within the fluidized bed. Therefore the combustion velocity is fast and the complete combustion is ensured even in a fluidized bed of a low height so that the heat of combustion can be efficiently transferred to the solid particles in the fluidized bed.

(ii) Since the combustion is carried out in a fluidized bed which is low in height, the power required for charging the fluidizing and combustion air into the furnace can be lowered.

(iii) A plurality of gas distribution pipes are provided which can be individually controlled, so that an optimum combustion can be attained. In addition, some of the gas distribution pipes can be selectively deactivated so that the combustion can be carried out at a desired localized portion in the fluidized bed and consequently the load can be varied over a wide range.

(iv) The solid particles in the fluidized bed heated to high temperatures start the combustion of the air and fuel mixture so that even the fuels with a low heat value can be completely burned in a stable manner.

What is claimed is:

1. A fluidized-bed combustion system comprising a plurality of gas distribution pipes disposed at a bottom of a furnace shell or combustion chamber and extending through said bottom of said furnace shell or combustion chamber into a fluidized-bed formed in said furnace shell or combustion chamber, each of said gas distribution pipes including a plurality of injection ports located adjacent to the bottom of said fluidized bed, each of said gas distribution pipes being communicated at its lower end extended out of said furnaces shell or combustion chamber with an individual air supply line with an air flow control valve and an individual fuel supply line with a fuel flow control valve, whereby aid and fuel supplied into said gas distribution pipes are mixed therein and injected or sprayed through said injection ports into the fluidized bed.

2. A fludized-bed combustion system as set forth in claim 1 wherein said injection ports of each gas distribution pipe are directed radially outwardly and horizontally.

3. A fluidized-bed combustion system as set forth in claim 1 wherein, in each of said gas distribution pipes, the fuel is supplied into an air stream formed within the gas distribution pipe for mixing the air with the fuel.

4. A fluidized-bed combustion system as set forth in claim 2 wherein, in each of said gas distribution pipes, the fuel is supplied into an air stream formed within the gas distribution pipe for mixing the air with the fuel.

5. A fluidized-bed combustion system as set forth in claim 4 wherein said fluid supply line is a pipe co-axially arranged within said gas distribution pipe.

6. A fluidized-bed combustion system as set forth in claim 5 wherein said fuel supply pipe is provided with openings that are aligned with the injection ports in said gas distribution pipe.

7. A fluidized-bed combustion system comprising: a combustion vessel having a fluidized-bed in the bottom thereof, a plurality of gas distribution pipes disposed adjacent to the bottom of said combustion vessel, each of said gas distribution pipes having one end extending through the bottom of said combustion vessel and into said fluidized-bed, a plurality of injection ports in each of said gas distribution pipes located adjacent to the bottom of said fluidized-bed, and each of said gas distribution pipes having its lower portion extending out of said combustion vessel, each of said plurality of gas distribution pipes having an air supply line provided with an air flow control valve connected to the other end of each said gas distribution pipe, and a fuel supply line with a fuel flow control valve for each of said gas distribution pipes, whereby air and fuel supplied into said gas distribution pipes are mixed therein and sprayed through said injection ports into said fluidized-beds.

8. A fluidized-bed combustion system as set forth in claim 7 wherein said inlet for said fuel supply line is located above the inlet for said air supply line in at least one of said gas distribution pipes.

* * * * *